(12) United States Patent
Santosuosso et al.

(10) Patent No.: US 10,776,247 B2
(45) Date of Patent: Sep. 15, 2020

(54) ELIMINATING RUNTIME ERRORS IN A STREAM PROCESSING ENVIRONMENT

(71) Applicant: International Business Machines Corporation, Armonk, NY (US)

(72) Inventors: John M. Santosuosso, Rochester, MN (US); Jason A. Nikolai, Rochester, MN (US); David M. Koster, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 15/977,682

(22) Filed: May 11, 2018

(65) Prior Publication Data

US 2019/0347184 A1    Nov. 14, 2019

(51) Int. Cl.
*G06F 11/00*    (2006.01)
*G06F 11/36*    (2006.01)
(Continued)

(52) U.S. Cl.
CPC ...... *G06F 11/3612* (2013.01); *G06F 11/0709* (2013.01); *G06F 11/3072* (2013.01)

(58) Field of Classification Search
CPC ............. G06F 11/3612; G06F 11/0709; G06F 11/3072; G06F 11/3006
See application file for complete search history.

(56) References Cited

U.S. PATENT DOCUMENTS 8,949,801 B2    2/2015 Andrade et al.
9,325,757 B2    4/2016 Uhlig et al.
(Continued)

FOREIGN PATENT DOCUMENTS

WO    2014144324 A1    9/2014

OTHER PUBLICATIONS

R. C. Fernandez, M. Migliavacca, E. Kalyvianaki, and P. Pietzuch, "Integrating scale out and fault tolerance in stream processing using operator state management," In Proceedings of the 2013 ACM SIGMOD international conference on Management of data, pp. 725-736. ACM, 2013. Retrieved from Internet using: http://openaccess.city.ac.uk/8175/1/sigmod13-seep.pdf.
(Continued)

*Primary Examiner* — Joseph D Manoskey
(74) *Attorney, Agent, or Firm* — Robert Bunker; Edell, Shapiro & Finnan, LLC (57) ABSTRACT

Methods, systems, and computer program products are provided for eliminating run-time errors in a stream processing environment. Processing devices receive tuples in a distributed stream processing environment. Each respective processing device checks the received tuples to determine whether a pattern of the received tuples matches one or more pattern profiles that cause run-time errors. When the pattern of the received tuples matches the one or more pattern profiles that cause run-time errors, the respective processing device performs an action to adjust a processing order of the received tuple to reduce an impact of the run-time errors. When the pattern of the received tuples does not match the one or more pattern profiles that cause run-time errors, the respective processing device performs a function on the received tuples. The functions are performed by an operator residing in the respective processing device.

11 Claims, 7 Drawing Sheets

(51) Int. Cl.
*G06F 11/07* (2006.01)
*G06F 11/30* (2006.01)

(56) References Cited

U.S. PATENT DOCUMENTS

| | | | |
|---|---|---|---|
| 9,641,580 B2 | 5/2017 | Zhou et al. | |
| 2008/0250265 A1* | 10/2008 | Chang .................. | G06F 11/008 714/4.12 |
| 2010/0293532 A1* | 11/2010 | Andrade ............. | G06F 11/1438 717/140 |
| 2014/0304545 A1* | 10/2014 | Chen ................... | G06F 11/1438 714/4.3 |
| 2014/0304549 A1* | 10/2014 | Hsu ..................... | G06F 11/0793 714/15 |
| 2016/0164719 A1 | 6/2016 | Pan et al. | |
| 2017/0132068 A1* | 5/2017 | Parra .................. | G06F 11/3409 |

OTHER PUBLICATIONS

T. Heinze, L. Aniello, L. Querzoni, and Z. Jerzak, "Cloud-based data stream processing," In Proceedings of the 8th ACM International Conference on Distributed Event-Based Systems, pp. 238-245. ACM, 2014. Retrieved from Internet using: http://www.dis.uniroma1.it/~midlab/articoli/paper%2066.pdf.

K. Yasumoto, H. Yamaguchi, and H. Shigeno, "Survey of real-time processing technologies of iot data streams," Journal of Information Processing 24, No. 2 (2016): 195-202. Retrieved from Internet using: https://www.jstage.jst.go.jp/article/ipsjjip/24/2/24_195/_pdf.

Tom Breur, "What to Do with Bad Data?," retrieved at http://www.b-eye-network.com/print/11553 , published Sep. 23, 2009.

* cited by examiner

ELIMINATING RUNTIME ERRORS IN A STREAM PROCESSING ENVIRONMENT

BACKGROUND

1. Technical Field

Present invention embodiments relate to methods, systems and computer program products for performing an action in a distributed stream processing environment to eliminate run-time errors. In particular, the present invention embodiments relate to methods, systems and computer program products for learning failing pattern profiles, detecting patterns of received tuples that match one of the failing pattern profiles in a distributed stream processing environment and performing an action to prevent a run-time error upon detecting a pattern of received tuples that match one of the failing pattern profiles.

2. Discussion of the Related Art

In stream computing distributed systems, an application is broken into small units of work, called operators, that are distributed to a number of processing devices. The operators execute in process containers, called processing elements (PEs), and process data when they arrive. A processing element includes one or more operators, each of which has code that performs some type of function on data. Examples of types of functions may include, but are not limited to, filtering, aggregating, and enrichment. The operators ingest or create tuples. A tuple is a sequence of attributes, which are named values and include data types.

In stream computing, data may arrive in tuples, are processed by an operator, and are then passed on to a next operator or operation in a streams graph. The data often originates from outside sources. Many of these outside sources provide unstructured data. Consequently, it is often difficult to code an application to check for every possible error on incoming data. Because of a large volume of data processed, sanitizing data in a streaming environment can be quite costly. One existing product, called IBM Streams, which is available from International Business Machines Corporation of Armonk, New York, includes a @catch clause, which catches errors and allows processing to continue when data exceptions occur. However the @catch clause is unable to catch all possible errors. Therefore, some errors may cause an operator to restart while data is arriving, thereby causing data loss until the restarting is completed.

SUMMARY

According to a first aspect of embodiments of the invention, a machine-implemented method is provided for eliminating run-time errors in a stream processing environment. Processing devices in the distributed stream processing environment receive tuples. Each respective processing device checks the received tuples to determine whether a pattern of the received tuples matches one or more pattern profiles that cause run-time errors. When the respective processing device determines that the pattern of the received tuples matches the one or more pattern profiles that cause run-time errors, the respective processing device performs an action to adjust a processing order of the received tuples to reduce an impact of the run-time errors. When the respective processing device determines that the pattern of the received tuples does not match the one or more pattern profiles that cause run-time errors, the respective processing device performs a function on the received tuples, wherein the function is performed by an operator executing in the respective processing device.

According to a second aspect of the embodiments of the invention, a system is provided for eliminating run-time errors in a distributed stream processing environment. The system includes multiple processing devices connected to a network in the distributed stream processing environment. Each of the processing devices includes at least one processor and a memory connected to the at least one processor. Each of the processing devices is configured to perform at least the following actions. Tuples are received in the distributed stream processing environment, and the received tuples are checked to determine whether a pattern of the received tuples matches one or more pattern profiles that cause run-time errors. When the pattern of the received tuples matches the one or more pattern profiles that cause run-time errors, an action is performed to adjust a processing order of the received tuples to reduce an impact of the run-time errors. When the pattern of the received tuples does not match the one or more pattern profiles that cause run-time errors, a function is performed on the received tuples by an operator executing in the processing device.

According to a third aspect of the embodiments of the invention, a computer program product including at least one computer readable storage medium having computer readable program code embodied therewith for execution on at least one processor of a processing device to eliminate run-time errors in a distributed stream processing environment. The computer readable program code is configured to be executed by the at least one processor to at least perform the following actions. The at least one processor receives tuples in the distributed stream processing environment and checks the received tuples to determine whether a pattern of the received tuples matches one or more pattern profiles that cause run-time errors. An action is performed to adjust a processing order of the received tuples to reduce an impact of the run-time errors when the pattern of the received tuples matches the one or more pattern profiles that cause run-time errors. An operator executing in the at least one processor performs a function on the received tuples when the pattern of the received tuples does not match the one or more pattern profiles that cause run-time errors.

BRIEF DESCRIPTION OF THE DRAWINGS

Generally, like reference numerals in the various figures are utilized to designate like components.

DETAILED DESCRIPTION

In a distributed stream processing environment, data is provided to a streams application, which turns raw data into tuples for processing in a streams infrastructure. Stream operators receive tuples, perform a function on the tuples, and output modified tuples to other operators or sinks. One or more operators may be included in a process called a processing element (PE). Each PE may be included in respective distributed processing devices that are connected via a network.

In processing devices, including processing devices executing in a distributed stream processing environment, unrecoverable errors, or exceptions, may occur. In the distributed stream processing environment, exceptions may occur for a number of reasons, including, but not limited to, receipt of bad data. For example, in the distributed stream processing environment, tuples may be received for processing by an operator, which expects one or more related tuple values to have been initialized. An exception may occur when the received tuples are processed by the operator and the related tuple values remain uninitialized.

In a communication layer of a multiple layered communication protocol infrastructure such as, for example, a transport layer or other layer executing on a processing device, received packets may be examined to determine whether the packets include tuples for an operator included in a PE executing on the processing device. If the packets include tuples, the received tuples may be checked to determine whether a pattern of the received tuples matches a known failing pattern profile from among one or more known failing pattern profiles. If the pattern of the received tuples matches the known failing pattern profile, then an action may be performed in order to prevent an occurrence of an exception. If the pattern of the received tuples does not match the known failing pattern profile, or if the received packets do not include tuples, processing may proceed without performing the action.

In various embodiments, the performed action is intended to prevent, or at least delay, an occurrence of an exception. In one embodiment, the action may include suppressing a tuple to prevent further processing of the tuple. In a second embodiment, the action may include suppressing the tuple and logging an occurrence of the tuple. In a third embodiment, the action may include reordering a position of the tuple such that processing of the tuple occurs at a later point in time. In a fourth embodiment, processing of a possible problematic tuple and following tuples intended for a same operator may be temporarily delayed to allow time for the operator to reset.

In some embodiments, when an operator experiences an exception, a tuple that caused the exception and a number of previously received tuples may be examined such that the embodiment may learn a new failing pattern profile using machine learning techniques such as, for example, any of a number of well-known machine learning techniques. For example, machine learning may identify a previously unknown failing pattern in which a last received tuple includes an attribute named total balance and the number of previously received tuples not including an attribute named initial balance.

Figure 1:
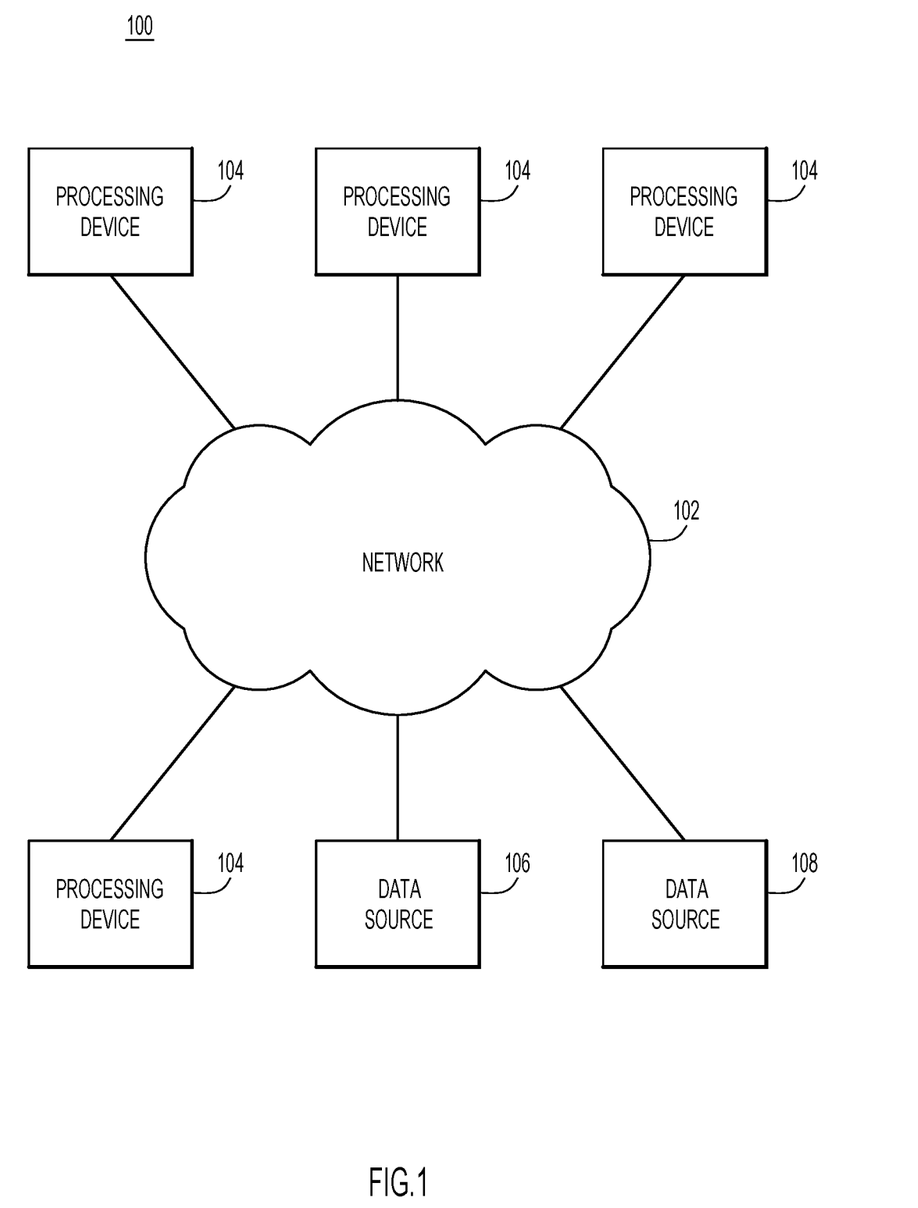
FIG. 1 illustrates an example distributed stream processing environment in which embodiments may operate.

FIG. 1 illustrates an example environment 100 in which various embodiments may operate. Example environment 100 may include a network 102 to which are connected, via a wired or wireless connection, a number of distributed processing devices 104 and one or more data sources 106, 108. Example environment 100 shows four processing devices 104. However, a typical operating environment may have many more distributed processing devices. In addition, FIG. 1 shows only two data sources. However, some operating environments may have one data source or many data sources.

Network 102 may be implemented by any number of any suitable communications media (e.g., wide area network (WAN), local area network (LAN), Internet, Intranet, etc.) or a combination of any of the suitable communications media. Network 102 may further include wired and/or wireless networks.

Processing device 104 may include a desktop computer, a laptop computer, a mainframe computer, a smartphone, a tablet computer, or other type of processing device.

Figure 2:
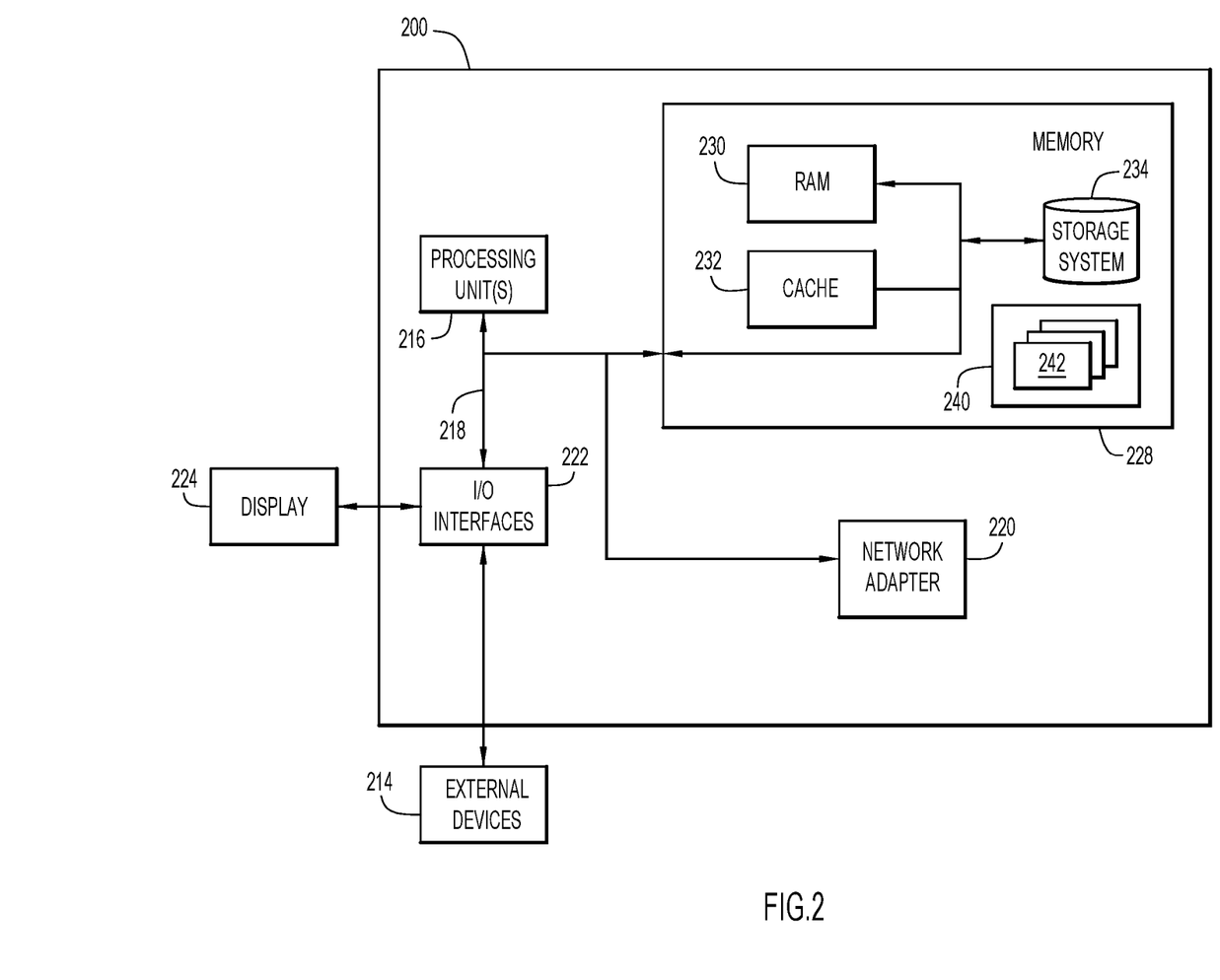
FIG. 2 illustrates an example computing system, which may implement a processing device according to embodiments of the invention.

Referring now to FIG. 2, a schematic of an example computing system 200 is shown. Computing system 200 may implement processing device 104. Computing system 200 is shown in a form of a general-purpose computing device. Components of computing system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 may include a variety of computer system readable media. Such media may be any available media that is accessible by computing system 200, and may include both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, one or more displays 224, one or more devices that enable a user to interact with computing system 200, and/or any devices (e.g., network card, modem, etc.) that enable computing system 200 to communicate with one or more other computing devices. Such communication can occur via Input/Output (I/O) interfaces 222. Still yet, computing system 200 can communicate with one or more networks such as a local area network (LAN), a general wide area network (WAN), and/or a public network (e.g., the Internet) via network adapter 220. As depicted, network adapter 220 communicates with the other components of computing system 200 via bus 218. It should be understood that, although not shown, other hardware and/or software components could be used in conjunction with computing system 200. Examples, include, but are not limited to: microcode, device drivers, redundant processing units, external disk drive arrays, RAID systems, tape drives, and data archival storage systems, etc.

Figure 3:
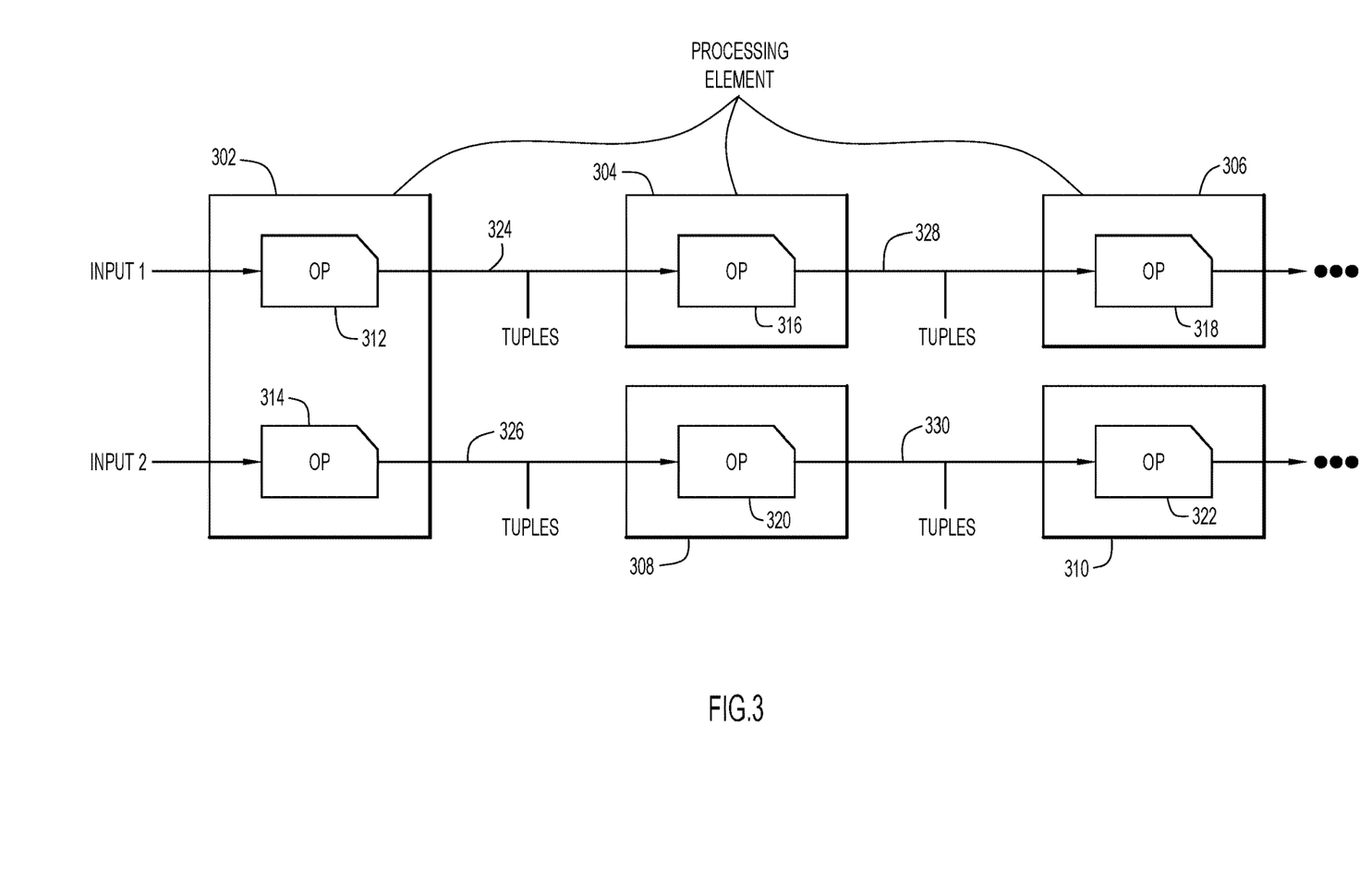
FIG. 3 shows a portion of an example stream graph according to embodiments.

FIG. 3 illustrates an example of a portion of a stream graph in a stream processing environment. FIG. 3 shows five PEs 302-310. PE 302 has two operators 312, 314 and each of PEs 304-310 include one operator, operators 316-322, respectively. Operators 312, 314 may receive unstructured data from input 1 and input 2, respectively. Operator 312 may process the unstructured data from input 1 to produce tuples 324, which are provided to operator 316 of PE 304. Operator 314 may process the unstructured data from input 2 to produce tuples 326, which are provided to operator 320 of PE 308. Modified tuples 328 may be produced by operator 316 and provided to operator 318 of PE 306. Modified tuples 330 produced by operator 320 may be provided to operator 322 of PE 310 and outputs of operators 318, 322 may be provided to other operators or sinks included in the stream graph.

In the stream graph of FIG. 3, each of the PEs 302-310 may reside on a different processing device at different locations, wherein each of the different processing devices may communicate with each other through a network. In another embodiment, some of the PEs may execute on a same processing device while other PEs may execute on different processing devices at different locations. Further, FIG. 3 shows PEs having either one or two operators. However, in other embodiments, some PEs may have more than two operators.

The Open Systems Interconnection model (OSI) characterizes and standardizes communication functions of a telecommunication or computing system. According to the model a communication system is partitioned into seven abstraction layers. A layer serves the layer above it and is served by the layer below it. The layers include a physical layer, a data link layer, a network layer, a transport layer, a session layer, a presentation layer and an application layer.

The transport layer provides functional and procedural means for transferring variable length data sequences from a source to a destination host, while maintaining quality of service functions. In some embodiments, the transport layer may be modified to determine whether any received packet includes a tuple and if so, whether the received tuple and received tuples that immediately precede the received tuple have a pattern that matches a known failing pattern profile.

If the received tuples match a known failing pattern profile, then an action may be performed to eliminate or mitigate an effect of an exception caused by bad data.

Figure 4:
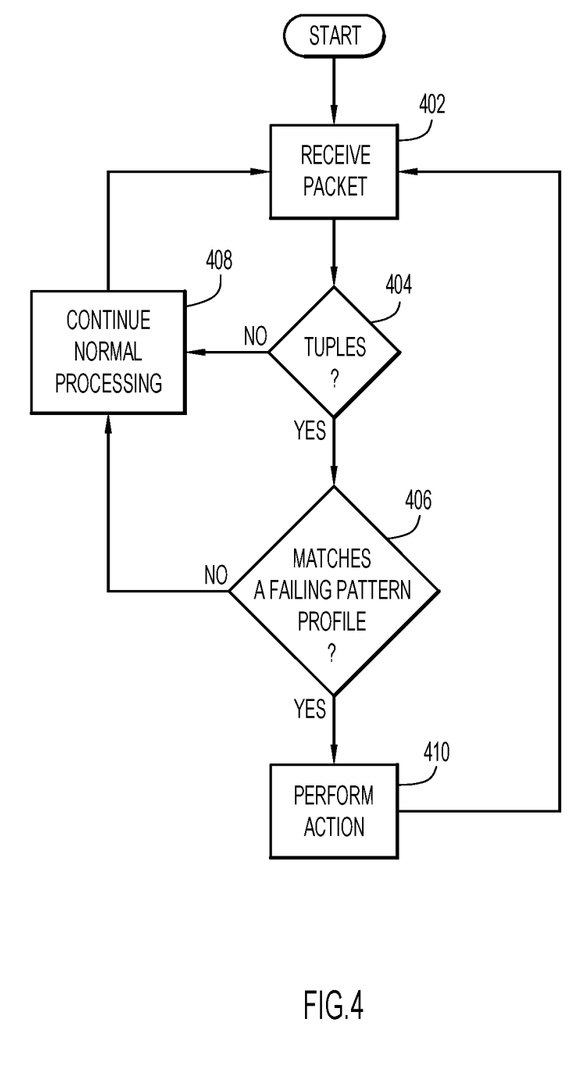
FIG. 4 is a flowchart that illustrates an example process for detecting received tuples and determining whether a pattern of the received tuples matches a known failing pattern profile according to embodiments of the invention.

FIG. 4 is a flowchart that illustrates processing in embodiments of the invention. As mentioned above, the processing may be performed in the transport layer in some embodiments.

The process may begin by receiving a packet from a source (act 402). The packet may be examined to determine whether the packet includes a tuple (act 404). If the packet is determined not to include the tuple, then the packet may continue to be processed (act 408) and a next packet may be received (act 402).

If, during act 404, the received packet is determined to include a tuple, then the received tuple and immediately preceding received tuples for a same operator may be compared against one or more failing pattern profiles to determine if a pattern of the received tuples matches any of the one or more failing pattern profiles (act 406). If no match is determined, then the packet will be continued to be processed (act 408) and a next packet may be received (act 402). However, if the pattern of the received tuples matches one of the one or more failing pattern profiles, then an action may be performed (act 410). As an example, one of the one or more failing patterns may include a received tuple including an attribute named total balance and a number of previously received tuples not including an attribute named initial balance.

Figure 5:
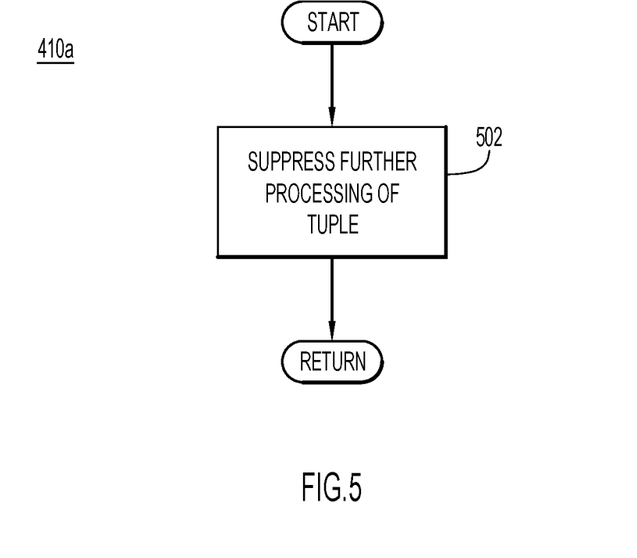
FIGS. 5-8 are flowcharts that illustrate example processes for performing different actions, in various embodiments, to prevent a negative effect when processing received tuples having a pattern that matches a known failing pattern profile according to embodiments of the invention.

FIG. 5 is a flowchart illustrating example processing of act 410 in an embodiment (act 410a). In this embodiment, processing of the received tuple may be suppressed (act 502). That is, the received tuple may be discarded and not processed further by any operators, thereby avoiding runtime exceptions.

Figure 6:
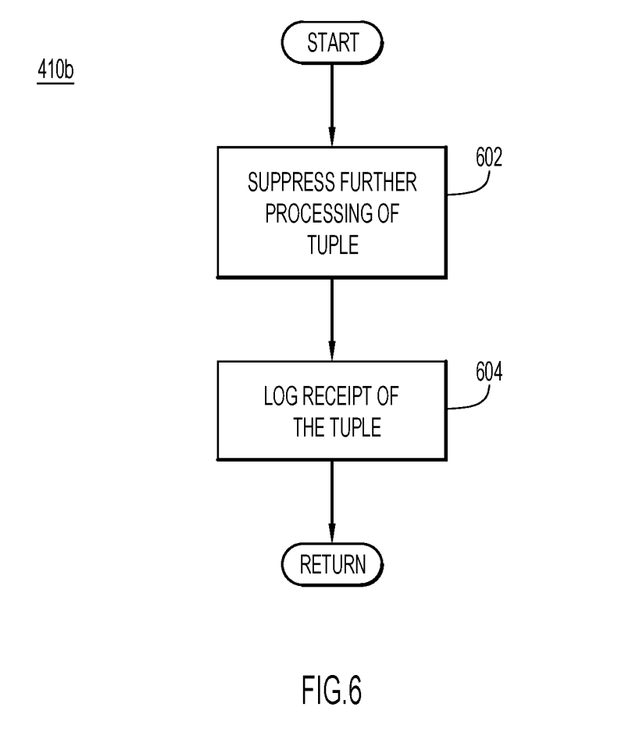

FIG. 6 is a flowchart illustrating example processing of act 410 in a second embodiment (act 410b). As previously mentioned with respect to act 502, the received tuple may be suppressed, or discarded, such that no further processing of the received tuple may be performed by any operators (act 602) and exceptions may be avoided. An entry may then be recorded in a log indicating the receipt of the tuple and, in some embodiments, may further log information regarding a matching failing pattern profile (act 604).

Figure 7:
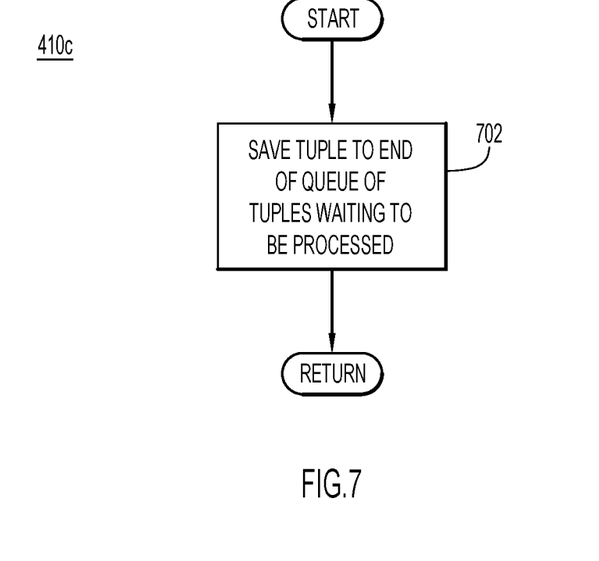

FIG. 7 is a flowchart illustrating example processing of act 410 in a third embodiment (act 410c). In this embodiment, the received tuple may be reordered such that it is processed after tuples that originally followed it. This may be achieved by moving the received tuple to an end of a queue of tuples waiting to be provided to a same operator as the received tuple (act 702). This delays an exception until after valid data has been processed, thereby preventing the exception from affecting other data.

Figure 8:
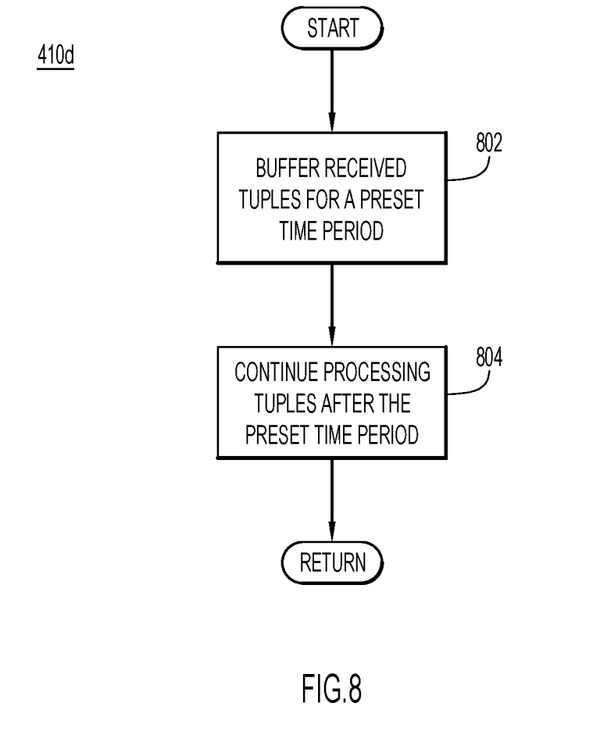

FIG. 8 is a flowchart illustrating example processing of act 410 in a fourth embodiment (act 410d). In this embodiment, the received tuple and tuples received following the received tuple for a same operator as the received tuple may be buffered for a preset period of time (act 802). The preset period of time is at least an amount of time in which an operator resets and becomes operational again. For example, the preset period of time may be two seconds, five seconds, 10 seconds, or another period of time that is at least the amount of time in which an operator resets and becomes operational again. After buffering the received tuples for the preset period of time, the buffered tuples as well as tuples received after the preset period of time, for the same operator, may be processed. This avoids any further data loss caused by tuples being received and provided to an operator that is currently resetting and not operational.

Figure 9:
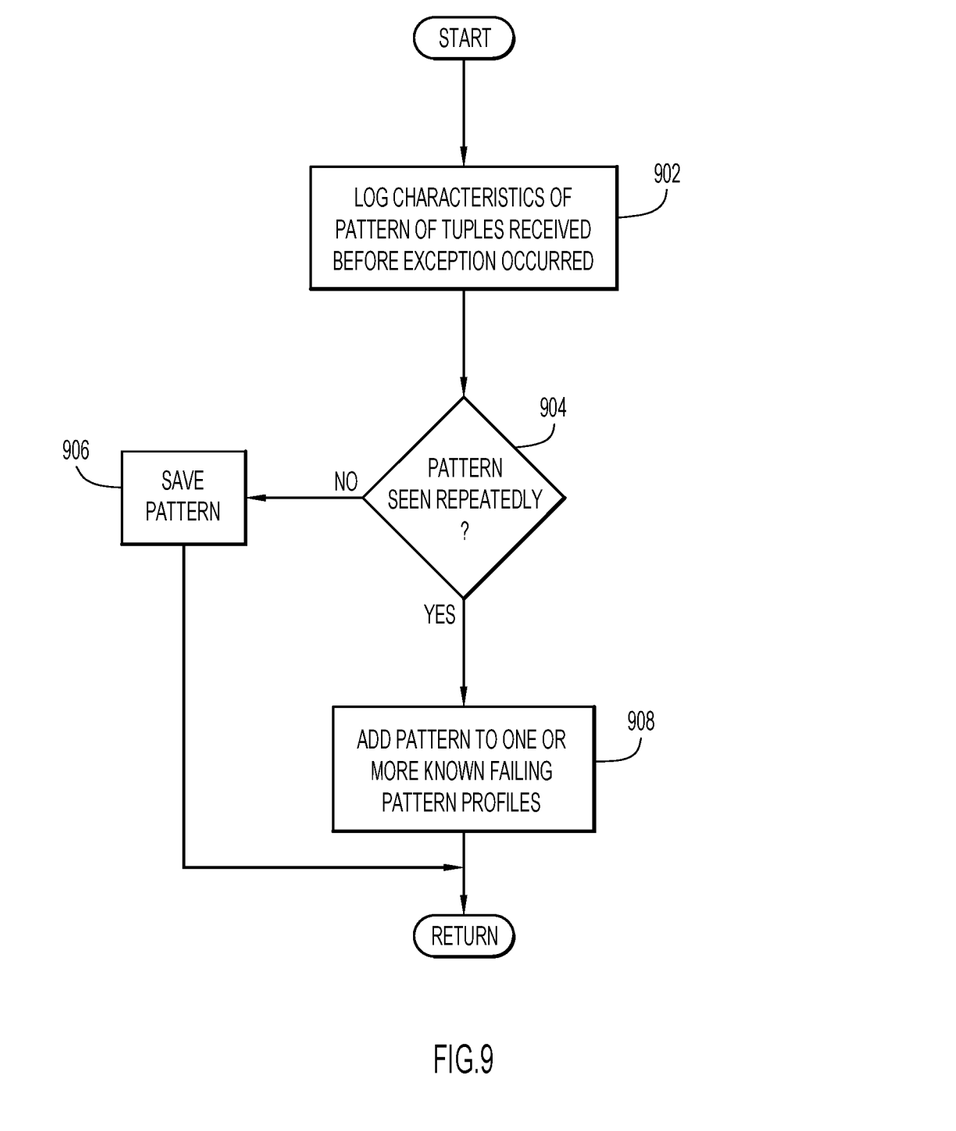
FIG. 9 is a flowchart that illustrates an example process for adding information regarding a new failing pattern of received tuples to one or more known failing pattern profiles according to embodiments of the invention.

In various embodiments, conventional machine learning techniques may be employed to learn new failing pattern profiles regarding received tuples. FIG. 9 is a flowchart of an example process that may be performed by a processing device according to embodiments of the invention that learn the new failing pattern profiles. The example process may be performed after processing of a received tuple causes an exception.

The process may begin with a processing device logging characteristics and information regarding a pattern of tuples received, including a last tuple that was being processed by an operator that just experienced an exception (act 902). Next, the processing device may determine whether the pattern of tuples was observed repeatedly when the exception occurred (act 904). The pattern may be considered to have been observed repeatedly when the exception occurred if the pattern had been observed at least a specific number of times when the exception occurred. The specific number of times may be 3 times, 5 times, 8 times, or another number of times. In some embodiments, the specific number of times may depend on a type of exception that occurred. For example, for types of exceptions that may be considered very serious, the pattern may be considered to have been observed repeatedly when observed a first time after the very serious exception occurred.

If, during act 904, the processing device determines that the pattern of received tuples had not been observed repeatedly, then the processing device may save information regarding the pattern and may keep track of a number of times the pattern had been observed when the exception occurred (act 906).

If, during act 904, the processing device determines that the pattern of tuples had been observed repeatedly when the exception occurred, then information regarding the pattern may be added to saved information regarding one or more known failing pattern profiles such that, upon recognizing the pattern in the received tuples, the processing device may perform an action to prevent an occurrence of the exception, as previously described.

It will be appreciated that the embodiments described above and illustrated in the drawings represent only a few of the many ways of implementing various embodiments for processing a request regarding relationships among instances of entities.

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various computing systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to server and/or client systems. The database systems and/or storage structures may be remote from or local to a computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A machine-implemented method for eliminating run-time errors in a distributed stream processing environment, the machine-implemented method comprising:
    receiving tuples by processing devices in the distributed stream processing environment;
    checking, by each respective processing device, the received tuples to determine whether a pattern of the received tuples matches one or more pattern profiles that cause run-time errors;
    when the checking, by a respective processing device, determines that the pattern of the received tuples matches the one or more pattern profiles that cause run-time errors, performing, by the respective processing device, an action to adjust a processing order of the received tuples to reduce an impact of the run-time errors, the action including moving a received tuple, the processing of which is expected to cause a run-time error, to an end of a queue of received tuples waiting to be provided to a same operator as the received tuple, thereby delaying the run-time error until after valid data has been processed in order to prevent the run-time error from affecting other data; and
    when the checking, by the respective processing device, determines that the pattern of the received tuples does not match the one or more pattern profiles that cause the run-time errors, performing, by the respective processing device, a function on the received tuples, the function being performed by the operator executing in the respective processing device.

2. The machine-implemented method of claim 1, further comprising:
    when any operator of a plurality of operators experiences an exception by attempting to process a received tuple, saving, by a processing device on which the any operator executes, information regarding the received tuple; and
    adding information regarding the pattern of the received tuples, destined for the any operator that experienced the exception, to the one or more pattern profiles.

3. The machine-implemented method of claim 1, further comprising:
    analyzing each respective received tuple associated with a corresponding experienced exception and a corresponding plurality of tuples received just before the respective received tuple to determine a new pattern profile.

4. The machine-implemented method of claim 1, wherein the action further comprises:
    recording an entry in a log indicating receipt of the received tuple and information regarding a matching pattern profile of the one or more pattern profiles.

5. A system for eliminating run-time errors in a distributed stream processing environment, the system comprising:
    a plurality of processing devices connected to a network in the distributed stream processing environment, each of the processing devices comprising:
        at least one processor; and
        a memory connected to the at least one processor, wherein each of the processing devices is configured to perform:
            receiving tuples in the distributed stream processing environment,
            checking the received tuples to determine whether a pattern of the received tuples matches one or more pattern profiles that cause run-time errors, and
            when the checking determines that the pattern of the received tuples matches the one or more pattern profiles that cause run-time errors, performing an action to adjust a processing order of the received tuples to reduce an impact of the run-time errors, the action including moving a received tuple, the processing of which is expected to cause a run-time error, to an end of a queue of received tuples waiting to be provided to a same operator as the received tuple, thereby delaying the run-time error until after valid data has been processed in order to prevent the run-time error from affecting other data; and
            when the checking determines that the pattern of the received tuples does not match the one or more pattern profiles that cause run-time errors, performing a function on the received tuples, the function being performed by the operator executing in a respective processing device.

6. The system of claim 5, wherein each of the processing devices is further configured to perform:
    when any operator of a plurality of operators experiences an exception by attempting to process a received tuple, saving information regarding the received tuple; and
    adding information regarding the pattern of the received tuples, destined for the any operator that experienced the exception, to the one or more pattern profiles.

7. The system of claim 5, wherein at least one of the processing devices is further configured to perform:
    analyzing each respective received tuple associated with a corresponding experienced exception and a corresponding plurality of tuples received just before the respective received tuple to determine a new pattern profile.

8. The system of claim 5, wherein the action further comprises:
    recording an entry in a log indicating receipt of the received tuple and information regarding a matching pattern profile of the one or more pattern profiles.

9. A computer program product comprising at least one computer readable storage medium having computer readable program code embodied therewith for execution on at least one processor of a processing device to eliminate run-time errors in a distributed stream processing environment, the computer readable program code being configured to be executed by the at least one processor to perform:
    receiving tuples in the distributed stream processing environment;
    checking the received tuples to determine whether a pattern of the received tuples matches one or more pattern profiles that cause run-time errors;
    when the checking determines that the pattern of the received tuples matches the one or more pattern profiles that cause run-time errors, performing an action to adjust a processing order of the received tuples to reduce an impact of the run-time errors, the action including moving a received tuple, the processing of which is expected to cause a run-time error, to an end of a queue of received tuples waiting to be provided to a same operator as the received tuple, thereby delaying the run-time error until after valid data has been processed in order to prevent the run-time error from affecting other data; and when the checking determines that the pattern of the received tuples does not match the one or more pattern profiles that cause run-time errors, performing a function on the received tuples, the function being performed by the operator executing in the at least one processor.

10. The computer program product of claim 9, wherein the at least one processor is further configured to perform:

when any operator of a plurality of operators executing on the at least one processor experiences an exception by attempting to process a received tuple, saving information regarding the received tuple; and adding information regarding the pattern of the received tuples, destined for the any operator that experienced the exception, to the one or more pattern profiles.

11. The computer program product of claim 9, wherein the at least one processor is further configured to perform:

analyzing each respective received tuple associated with a corresponding experienced exception and a corresponding plurality of tuples received just before the respective received tuple to determine a new pattern profile.

* * * * *